(12) United States Patent
Patange et al.

(10) Patent No.: US 12,045,320 B2
(45) Date of Patent: Jul. 23, 2024

(54) SYSTEMS AND METHODS FOR SOFTWARE LICENSE METERING VIA CRYPTO-BASED TELEMETRY

(71) Applicant: Rockwell Automation Technologies, Inc., Mayfield Heights, OH (US)

(72) Inventors: Nikhil Ashok Patange, Pune (IN); Krutika Kansara, Bangalore (IN); Francisco P. Maturana, Lyndhurst, OH (US); David Picou, Chagrin Falls, OH (US); Raja Sekhar Katuri, Oak Creek, WI (US); Joseph Weller, Milwaukee, WI (US); Hanna Strohm, West Allis, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/729,074

(22) Filed: Apr. 26, 2022

(65) Prior Publication Data
US 2023/0342435 A1    Oct. 26, 2023

(51) Int. Cl.
*G06F 21/10* (2013.01)
*G06Q 20/06* (2012.01)
*H04L 9/32* (2006.01)

(52) U.S. Cl.
CPC ....... *G06F 21/105* (2013.01); *G06Q 20/0658* (2013.01); *H04L 9/3213* (2013.01); *G06F 21/107* (2023.08); *G06Q 2220/12* (2013.01)

(58) Field of Classification Search
CPC .......... G06F 21/105; G06F 2221/0757; G06Q 20/0658; G06Q 2220/12; H04L 9/3213
See application file for complete search history.

(56) References Cited

U.S. PATENT DOCUMENTS

2007/0050301 A1*  3/2007  Johnson ............... H04L 9/00
                                              705/59
2008/0306786 A1* 12/2008  Lonowski ............ G06Q 30/06
                                              707/999.107

(Continued)

FOREIGN PATENT DOCUMENTS

| CN | 109117607 A  * |  1/2019 | ........... G06F 21/105 |
| EP | 3396575 A1 * | 10/2018 | ........... G06F 21/105 |
| EP | 3564881 A1   | 11/2019 | |

OTHER PUBLICATIONS

"An approach to Open-Source Software License Management using Blockchain-based Smart Contracts", Abhay Kumar, Feb. 24, 2022, ACM International Conference Proceeding Series (Year: 2022).*

(Continued)

*Primary Examiner* — Duan Zhang
(74) *Attorney, Agent, or Firm* — Fletcher Yoder, P.C.

(57) ABSTRACT

A non-transitory computer readable medium stores instructions that, when executed by a processor, cause the processor to receive telemetry data representing usage of one or more software assets by one or more industrial automation devices within an industrial automation system operated by an enterprise, reference a local blockchain that is a private extension of a global decentralized blockchain to determine one or more licenses associated with the one or more software assets, determine one or more usage parameters for the one or more software assets based on the telemetry data and the one or more licenses, update the local blockchain and the global decentralized blockchain based on the and the usage parameters, and enable usage of the one or more software assets by the one or more industrial automation devices based on the one or more usage parameters and one or more thresholds defined by the one or more licenses.

18 Claims, 11 Drawing Sheets

(56) References Cited

U.S. PATENT DOCUMENTS

| | | | |
|---|---|---|---|
| 2014/0214634 A1* | 7/2014 | Hearty | G06Q 10/087 |
| | | | 705/28 |
| 2018/0183687 A1* | 6/2018 | Dementev | H04L 41/50 |
| 2018/0240265 A1* | 8/2018 | Yang | G06T 5/006 |
| 2018/0287893 A1 | 10/2018 | O'Brien et al. | |
| 2019/0286794 A1* | 9/2019 | Jose | G06F 21/31 |
| 2019/0392119 A1* | 12/2019 | Rahiman | H04L 9/3239 |
| 2020/0134139 A1 | 4/2020 | Vaish et al. | |
| 2021/0056177 A1* | 2/2021 | Kozul | G06Q 30/0185 |
| 2023/0054904 A1* | 2/2023 | Crowley | G06F 21/105 |
| 2023/0085481 A1* | 3/2023 | Padmanabhan | G06Q 30/0601 |
| | | | 705/64 |

OTHER PUBLICATIONS

Extended European Search Report for Application No. 23168924.1 mailed Sep. 7, 2023, 9 pages.

* cited by examiner

SYSTEMS AND METHODS FOR SOFTWARE LICENSE METERING VIA CRYPTO-BASED TELEMETRY

BACKGROUND

The present disclosure generally relates to software used by industrial automation devices. More specifically, the present disclosure relates to tracking and managing software asset usage by industrial automation devices.

Industrial automation systems may be used to provide automated control of one or more actuators in an industrial setting. These industrial automation systems may utilize software and/or services during operation. Typically, components of an industrial automation system operate on a private network such that communication of components within the private network with devices that are outside of the private network is limited or prohibited. Accordingly, tracking usage of the software and/or services by the industrial automation system and enforcing licenses for the software and/or services can be difficult for software and/or service providers. It may be desirable to develop techniques for managing software licensing and usage by industrial automation systems in industrial settings.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a non-transitory computer readable medium stores instructions that, when executed by a processor, cause the processor to receive telemetry data representing usage of one or more software assets by one or more industrial automation devices within an industrial automation system operated by an enterprise, reference a local blockchain that is a private extension of a global decentralized blockchain to determine an amount of entitlement the enterprise has for the one or more software assets, determine an entitlement usage of the amount of entitlement the enterprise has for the one or more software assets based on the telemetry data, update the local blockchain and the global decentralized blockchain based on the entitlement usage, and meter usage of the one or more software assets by the one or more industrial automation devices based on a remaining amount of entitlement the enterprise has for the one or more software assets.

In another embodiment, a method includes receiving telemetry data representative of usage of one or more software assets by one or more industrial automation devices within an industrial automation system operated by an enterprise, uploading the received telemetry data to a remote server, referencing a local blockchain to determine an amount of entitlement the enterprise has for the one or more software assets, wherein the local blockchain comprises a private extension of a global decentralized blockchain, determining an entitlement usage of the amount of entitlement the enterprise has for the one or more software assets based on the telemetry data, updating the local blockchain based on the entitlement usage, updating the global decentralized blockchain based on the entitlement usage, and generating limits of usage of the one or more software assets by the one or more industrial automation devices based on a remaining amount of entitlement the enterprise has for the one or more software assets. This embodiment provides an autonomous agent-like solution to distributed metering telemetry processing.

In another embodiment, a non-transitory computer readable medium stores instructions that, when executed by a processor, cause the processor to receive telemetry data representative of usage of one or more software assets by one or more industrial automation devices within an industrial automation system operated by an enterprise, reference a local blockchain to determine an amount of entitlement the enterprise has for the one or more software assets, determine an entitlement usage of the amount of entitlement the enterprise has for the one or more software assets based on the telemetry data, update the local blockchain based on the entitlement usage, determine that a remaining amount of entitlement the enterprise has for the one or more software assets is below a threshold value, exchange an amount of cryptographic tokens stored in a cryptographic token wallet in for additional entitlement, and update the local blockchain to reflect the exchange for the additional entitlement.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
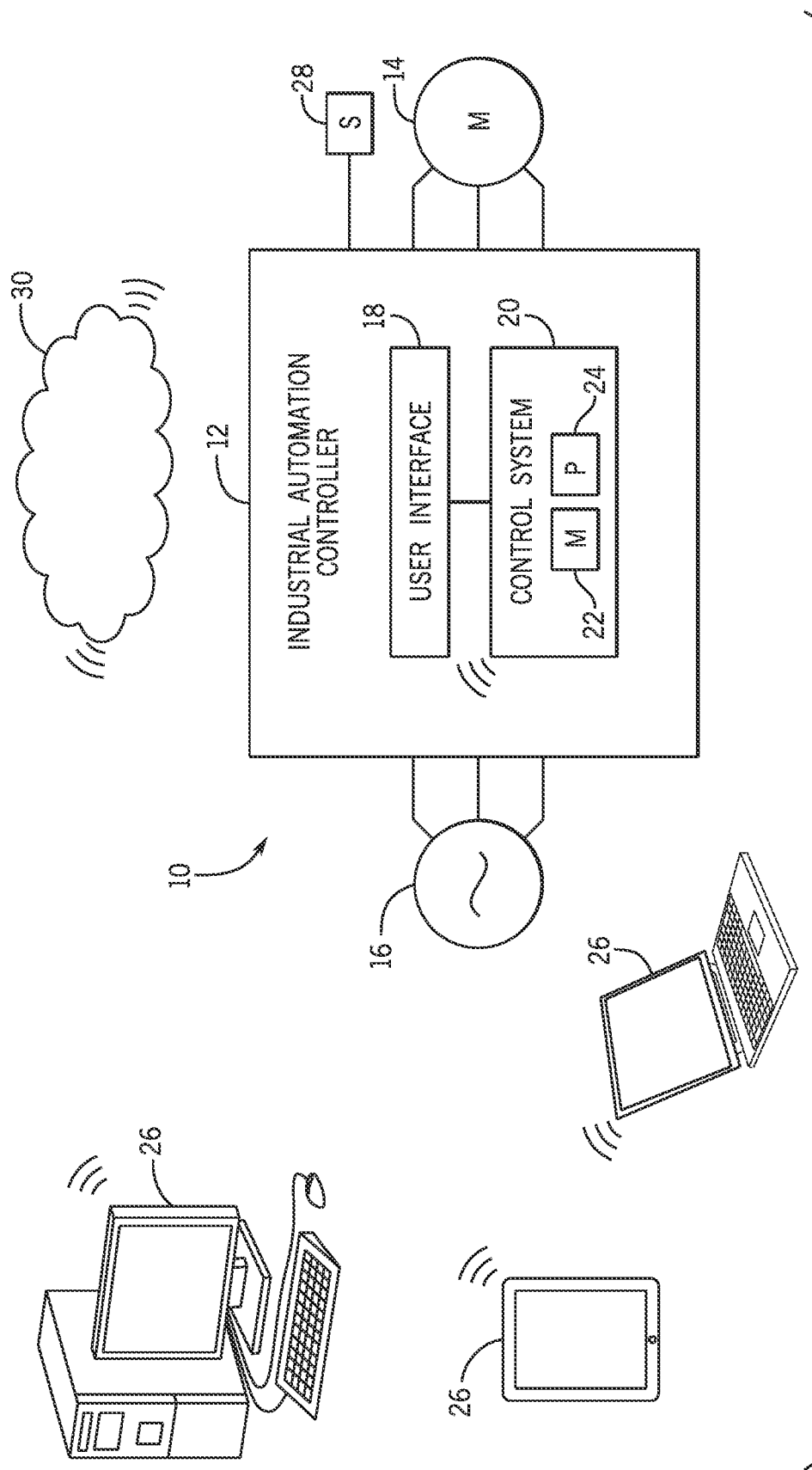
FIG. 1 illustrates a schematic view of an industrial automation system, including a controller, a computing device, and a remote server, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure includes techniques for tracking software asset usage and managing software licenses for an industrial automation system. A computing device collects telemetry data representative of usage of one or more software assets by industrial automation devices within an industrial automation system operated by an enterprise. The computing device references a local blockchain, which may be a private extension of a global decentralized blockchain (e.g., Ethereum blockchain) to determine entitlements that the enterprise has for the one or more software assets. The computing device determines entitlement usage based on the received telemetry data. The computing device updates the local blockchain and the global decentralized blockchain based on the determined entitlement usage. The computing device meters usage of the one or more software assets by the one or more industrial automation devices based on a remaining amount of entitlement. That is, if the remaining amount of entitlement is used up, the computing device may prevent the one or more industrial automation devices from using the one or more software assets until additional entitlement is purchased. If the remaining amount of entitlement falls below some threshold level, or some other desirable level, cryptographic tokens stored in a wallet may be exchanged for additional entitlement. Correspondingly, if the remaining amount of entitlement rises above some threshold level, or some other desirable level, some of the remaining amount of entitlement may be exchanged for cryptographic tokens to be stored in the wallet. The enterprise may also exchange currency for additional cryptographic tokens that may be stored in the wallet. When such transactions occur, the local and global blockchains may be updated to reflect the transactions. In some cases, the computing device may execute a metering agent to upload the telemetry data to a remote server, analyze the received telemetry data, generate one or more visualizations of identified trends within the received telemetry data, and present the one or more visualizations via an admin portal. The computing device may also execute an entitlement agent to upload the telemetry data to manage the cryptographic token wallet and update the local and global blockchains, generate one or more visualizations of one or more trends in the entitlement usage, and present the one or more visualizations via a user portal. Additional details with regard to managing software asset licensing and usage in accordance with the techniques described above will be provided below with reference to FIGS. 1-11.

By way of introduction, FIG. 1 is a schematic view of an example industrial automation system 10 in which the embodiments described herein may be implemented. As shown, the industrial automation system 10 includes a controller 12 and an actuator 14 (e.g., a motor). The industrial automation system 10 may also include, or be coupled to, a power source 16. The power source 16 may include a generator, an external power grid, a battery, or some other source of power. The controller 12 may be a stand-alone control unit that controls multiple industrial automation components (e.g., a plurality of motors 14), a controller 12 that controls the operation of a single automation component (e.g., motor 14), or a subcomponent within a larger industrial automation system 10. In the instant embodiment, the controller 12 includes a user interface 18, such as a human machine interface (HMI), and a control system 20, which may include a memory 22 and a processor 24. The controller 12 may include a cabinet or some other enclosure for housing various components of the industrial automation system 10, such as a motor starter, a disconnect switch, etc.

The control system 20 may be programmed (e.g., via computer readable code or instructions stored on the memory 22 and executable by the processor 24) to provide signals for controlling the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through licensed software or firmware code that may be loaded onto the internal memory 22 of the control system 20 (e.g., via a locally or remotely located computing device 26) or programmed via the user interface 18 of the controller 12. The control system 20 may respond to a set of operating parameters. The settings of the various operating parameters may determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) control programming, and the like.

In some embodiments, the controller 12 may be communicatively coupled to one or more sensors 28 for detecting operating temperatures, voltages, currents, pressures, flow rates, and other measurable variables associated with the industrial automation system 10. With feedback data from the sensors 28, the control system 20 may keep detailed track of the various conditions under which the industrial automation system 10 may be operating. For example, the feedback data may include conditions such as actual motor speed, voltage, frequency, power quality, alarm conditions, etc. In some embodiments, the feedback data may be communicated back to the computing device 26 for additional analysis (e.g., via licensed software or paid services).

The computing device 26 may be communicatively coupled to the controller 12 via a wired or wireless connection. The computing device 26 may receive inputs from a user defining an industrial automation project using a native application running on the computing device 26 or using a web site accessible via a browser application, a software application, or the like. The user may define the industrial automation project by writing code, interacting with a visual programming interface, inputting, or selecting values via a graphical user interface, or providing some other inputs. The user may use licensed software and/or subscription services to create, analyze, and otherwise develop the project. The computing device 26 may send a project to the controller 12 for execution. Execution of the industrial automation project causes the controller 12 to control components (e.g., motor 14) within the industrial automation system 10 through performance of one or more tasks and/or processes. In some applications, the controller 12 may be communicatively positioned in a private network and/or behind a firewall, such that the controller 12 does not have communication access outside a local network and is not in communication with any devices outside the firewall, other than the computing device 26. As previously discussed, the controller 12 may collect feedback data during execution of the project, and the feedback data may be provided back to the computing device 26 for analysis by one or more licensed software and/or subscription services. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be communicatively coupled to a cloud server 30 or remote server via the internet, or some other network. In one embodiment, the cloud server 30 may be operated by the manufacturer of the controller 12, a software provider, a seller of the controller 12, a service provider, operator of the controller 12, owner of the controller 12, etc. The cloud server 30 may be used to help customers create and/or modify projects, to help troubleshoot any problems that may arise with the controller 12, or to provide other services (e.g., project analysis, enabling, restricting capabilities of the controller 12, data analysis, controller firmware updates, etc.). The remote/cloud server 30 may be one or more servers operated by the manufacturer, software provider, seller, service provider, operator, or owner of the controller 12. The remote/cloud server 30 may be disposed at a facility owned and/or operated by the manufacturer, software provider, seller, service provider, operator, or owner of the controller 12. In other embodiments, the remote/cloud server 30 may be disposed in a datacenter in which the manufacturer, software provider, seller, service provider, operator, or owner of the controller 12 owns or rents server space. In further embodiments, the remote/cloud server 30 may include multiple servers operating in one or more data center to provide a cloud computing environment.

Figure 2:
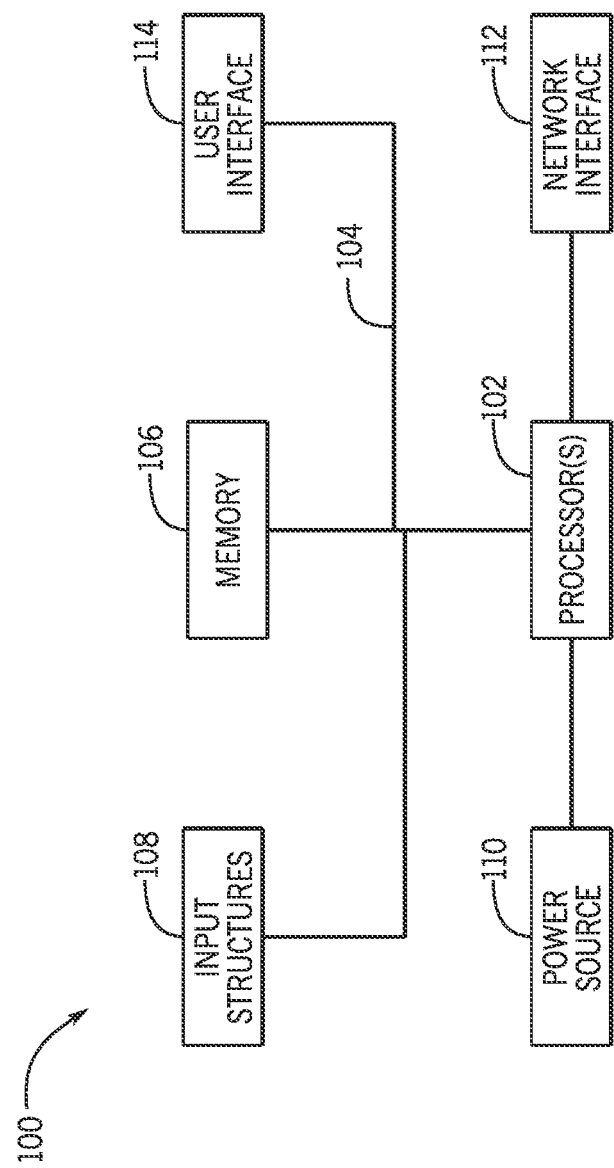
FIG. 2 illustrates a block diagram of example components that could be used as the controller, the computing device, and/or the remote server of FIG. 1, in accordance with embodiments presented herein.

FIG. 2 illustrates a block diagram of example components of a computing device 100 that could be used as the computing device 26, the cloud/remote server 30, the controller 12, or some other device within the system 10 shown in FIG. 1. As used herein, a computing device 100 may be implemented as one or more computing systems including laptop, notebook, desktop, tablet, HMI, or workstation computers, as well as server type devices or portable, communication type devices, such as cellular telephones and/or other suitable computing devices.

As illustrated, the computing device 100 may include various hardware components, such as one or more processors 102, one or more busses 104, memory 106, input structures 112, a power source 114, a network interface 116, a user interface 118, and/or other computer components useful in performing the functions described herein.

The one or more processors 102 may include, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines. Although shown for convenience as a single block in FIG. 2, the memory 106 may encompass various discrete media in the same or different physical locations. The one or more processors 102 may access data in the memory 106 via one or more busses 104.

The input structures 112 may allow a user to input data and/or commands to the device 100 and may include mice, touchpads, touchscreens, keyboards, controllers, and so forth. The power source 114 can be any suitable source for providing power to the various components of the computing device 100, including line and battery power. In the depicted example, the device 100 includes a network interface 116. Such a network interface 116 may allow communication with other devices on a network using one or more communication protocols. In the depicted example, the device 100 includes a user interface 118, such as a display that may display images or data provided by the one or more processors 102. The user interface 118 may include, for example, a monitor, a display, and so forth. As will be appreciated, in a real-world context a processor-based system, such as the computing device 100 of FIG. 2, may be employed to implement some or all of the present approach, such as performing the functions of the controller, the computing device 26, and/or the cloud/remote server 30 shown in FIG. 1, as well as other memory-containing devices.

Returning to FIG. 1, an enterprise may utilize licensed software and/or subscription services running on the computing device 26 or the controller 12, in design of the industrial automation system 10, operation of the industrial automation system 10, and/or analysis of the industrial automation system 10. Accordingly, the enterprise may wish to track its usage of the licensed software and/or subscription services and/or manage its licenses. However, components of the industrial automation system 10 may operate on a private network such that communication of components within the private network with devices that are outside of the private network is limited or prohibited. Accordingly, tracking usage of the software and/or services by the industrial automation system and managing licenses for the software and/or services can be difficult.

Figure 3:
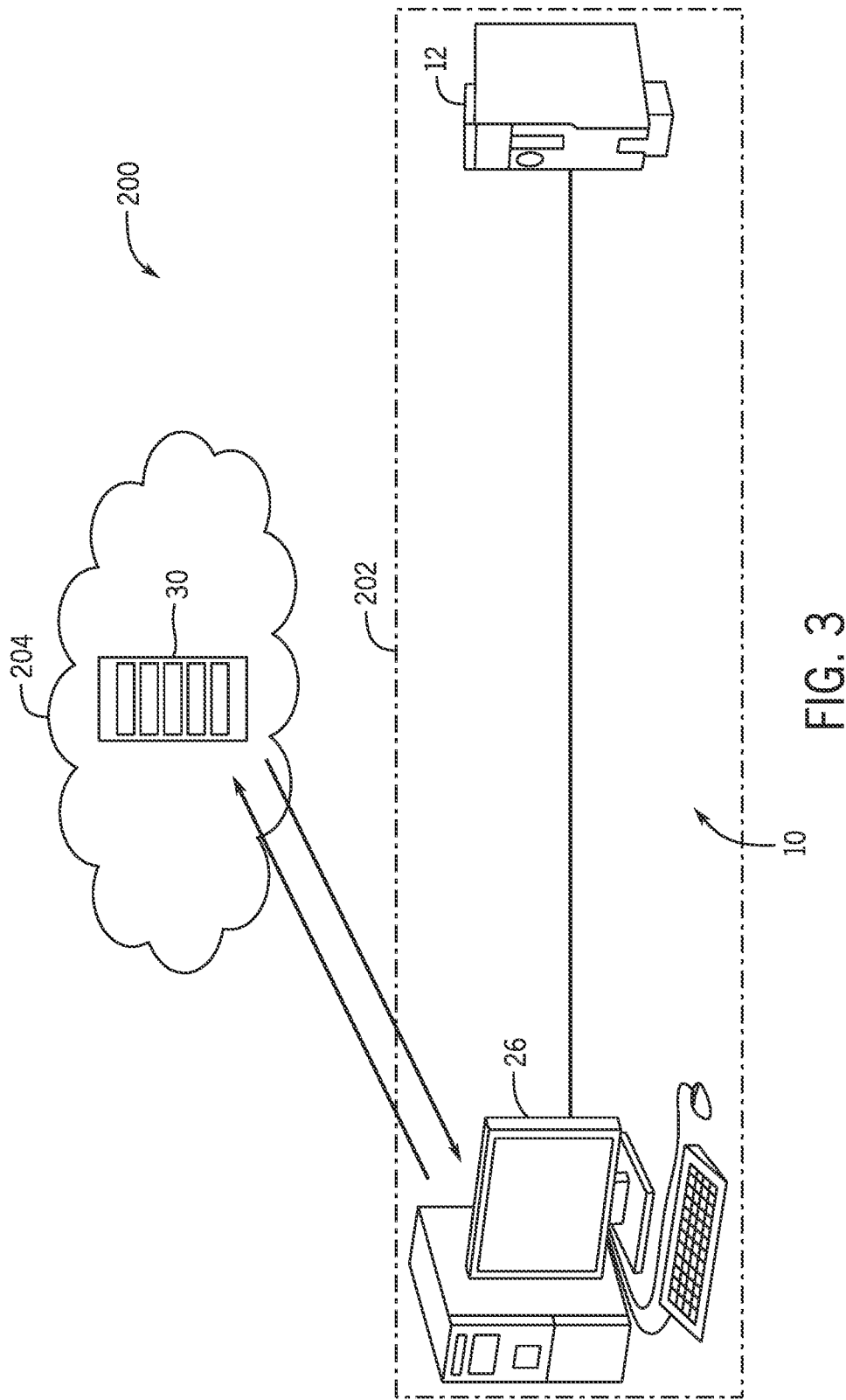
FIG. 3 illustrates a schematic of a system for providing software, firmware, and/or services to one or more components of the industrial automation system of FIG. 1, in accordance with embodiments presented herein.

With the preceding in mind, FIG. 3 illustrates a schematic of a system 200 for providing software, firmware, or services to one of more components (e.g., the industrial automation controller 12, the computing device 26, etc.) of an industrial automation system 10. As shown, the industrial automation system 10 is disposed within a private network 202, which may include a network address translation (NAT). The remote server 30 may be disposed in a public network 204 (e.g., the internet). Devices within the private network 202 may not be reachable by devices within the public network 204, but devices within the public network 204 may be reachable by devices within the private network 202. Accordingly, the computing device 26 may establish a connection with the remote server 30 and exchange data with the remote server 30.

After a connection is established between the computing device 26 and the remote server 30, the computing device 26 may periodically collect software telemetry data regarding software and/or service usage by devices on the private network 202, consolidate the collected software telemetry data and transmit software telemetry data to the remote server 30 (e.g., right management server). Further, the computing device 26 may receive software telemetry data about licenses and/or permitted software/service use from the remote server 30. In some embodiments, the computing device 26 may also receive software/firmware updates from the remote server 30. The computing device 26 may distribute received software telemetry data to various devices (e.g., the industrial automation controller 12) within the industrial automation system 10.

Figure 4:
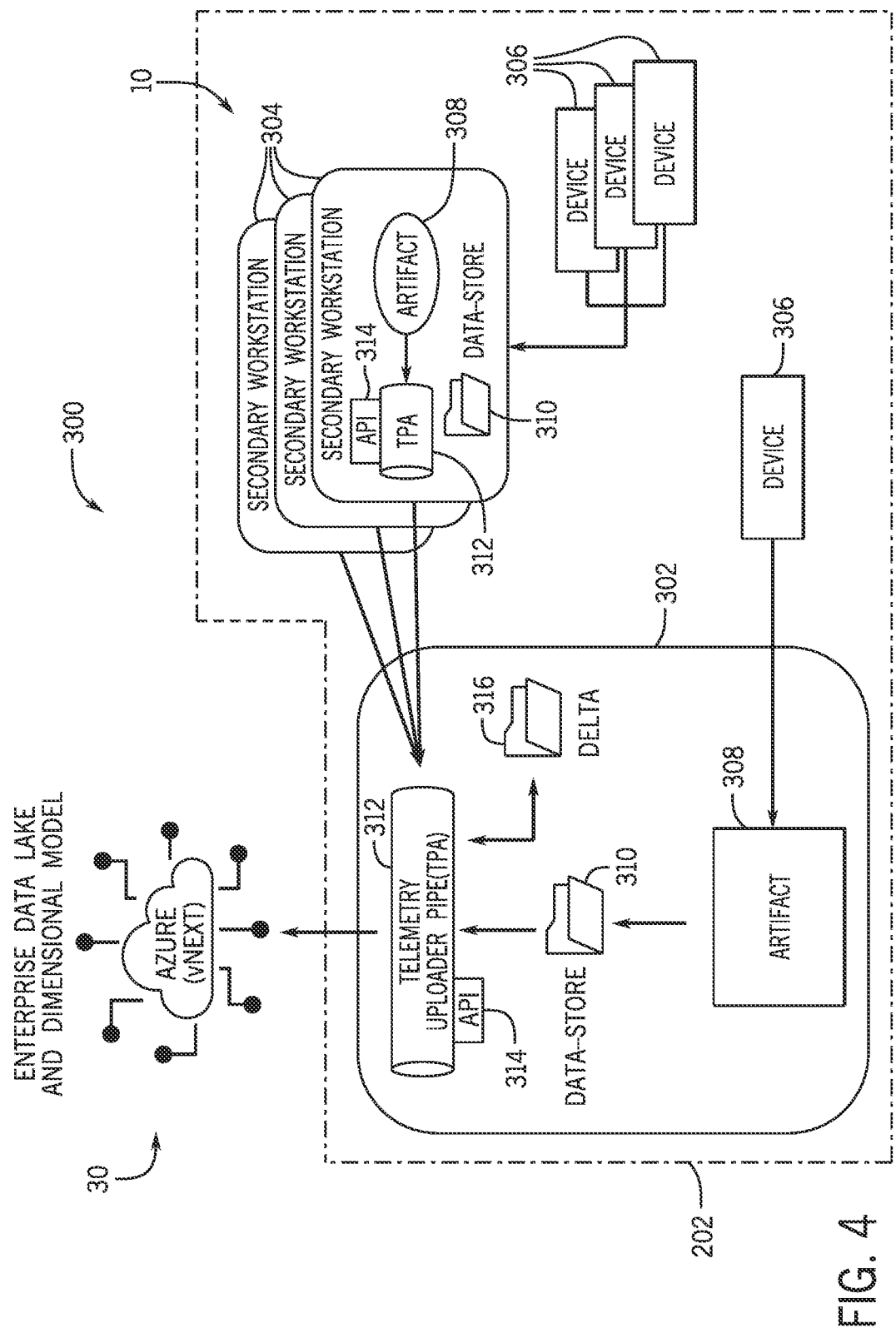
FIG. 4 illustrates a network topology for managing software asset licensing and usage in the industrial automation system of FIG. 1, including a primary node and multiple secondary nodes, each having respective telemetry pipeline agents (TPAs), in accordance with aspects of the present disclosure.

FIG. 4 illustrates a network topology 300 for managing software asset licensing and usage in an industrial automation context. As shown in FIG. 4, the private network 202 includes multiple workstations, including a primary workstation 302 and one or more secondary workstations 304. The workstations 302, 304 may include, for example, personal computers, desktop computers, laptop computers, tablets, mobile devices, specialty computers, such as a human-machine interface (HMI), or any other computer device, and may be considered nodes of the private network 202. Each of the workstations 302, 304 may be connected to one or more devices 306, which may include industrial automation controllers, industrial automation drives, actuators, sensors, circuit breakers, input/output (I/O) systems, networking equipment, power supplies, power converters, and the like. In some embodiments, the workstations 302, 304 may provide data to the devices 306 that controls the devices 306 or otherwise specifies one or more operational characteristics of connected devices 306. The devices 306 may provide artifacts 308 (e.g., operational data) to connected workstations 302, 304, which the workstations 302, 304 store in a local database 310. The artifacts 308 may include data regarding activities performed by the devices 306, as well as algorithms, engines, software features, etc. utilized by the devices 306.

Each workstation 302, 304 includes a telemetry pipeline agent (TPA) 312 that analyzes received artifacts 308 and generates a data delta set, which represents a change in the artifacts 308 by comparing the received artifacts 308 to one or more previous artifacts 308. The data delta for each workstation 302, 304 may be stored in the respective local database 310 of the workstation 302, 304 (e.g., in a data delta folder). The local TPAs of the secondary workstations 304 aggregate the data delta, encrypt the data delta, and periodically transmit encrypted aggregated data delta to the TPA 312 of the primary workstation 302 via a delta exchange protocol. Transmitting data delta sets, rather than complete data sets helps to reduce network traffic and increase transmission speeds. As illustrated in FIG. 4, TPA application programming interfaces (APIs) 314 may be used to access and specify various aspects of the TPAs, such as rates of transmission, frequency of transmission, timing of transmission, reporting (e.g., via trace logs), and so forth. The TPA 312 of the primary workstation 302 receives the various sets of data delta from the TPAs of the secondary workstations 304, synchronizes the data delta to remove redundant entries, consolidates the data delta into a single representation of the data delta for the whole industrial automation system 10 and stores the consolidated data delta representation in a local data delta store 316, which may or may not be within the local database 310 of the primary workstation 302. The TPA 312 of the primary workstation 302 periodically uploads the single representation of the delta for the industrial automation system 10 to the remote server 30. As previously discussed, the TPA 312 of the primary workstation may be accessed via an API 314 to specify various aspects of the TPA, such as rates of transmission, frequency of transmission, timing of transmission, reporting (e.g., via trace logs), and so forth. Based on data delta uploaded to the remote server, a software/service provider may determine what software/services were used and how much, whether the software/services used falls below, within, or above limits specified by existing licenses, whether additional licenses are needed, true up costs, whether any existing licenses are being under used or not used at all, and so forth.

Figure 5:
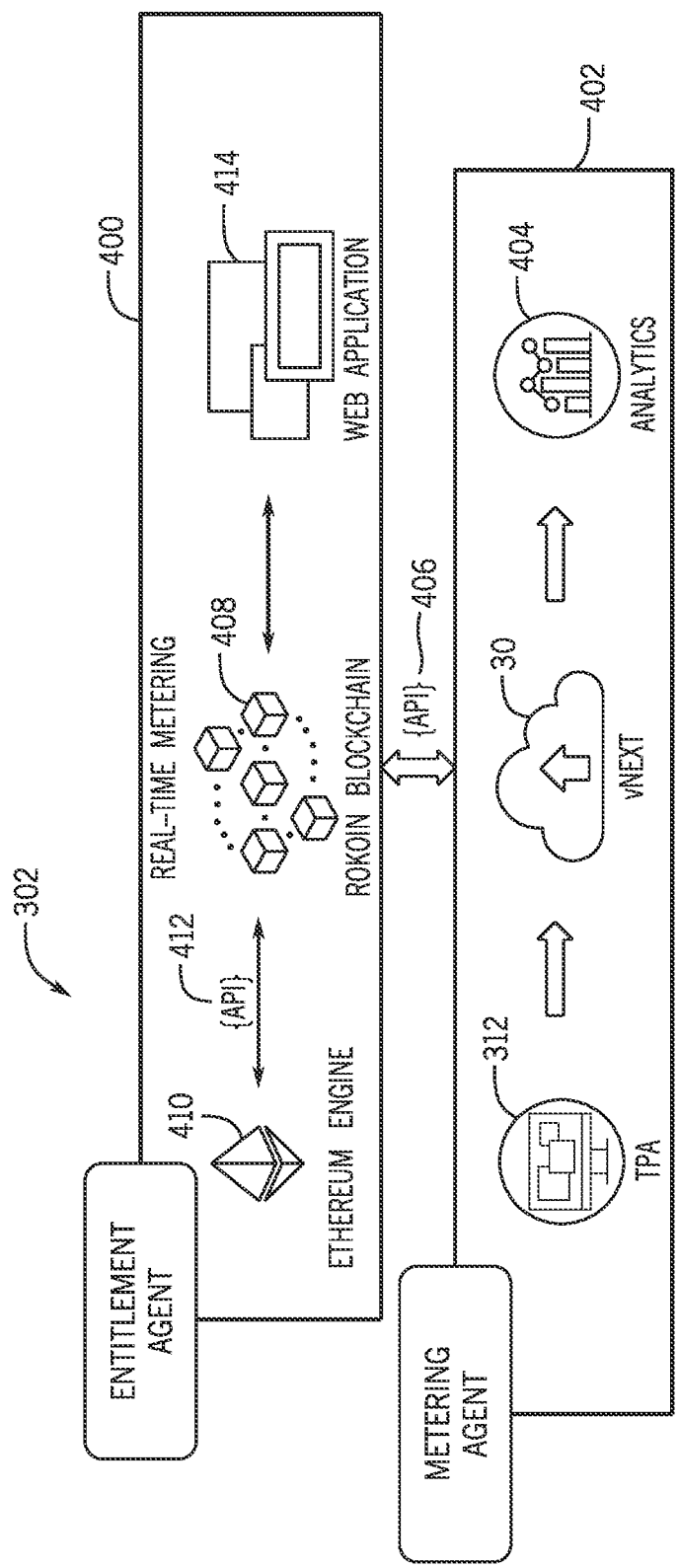
FIG. 5 illustrates a schematic of an entitlement agent and a metering agent that execute on the primary node of FIG. 4, in accordance with aspects of the present disclosure.

In some embodiments, the primary node 302 may be responsible for managing licenses, enforcing licenses, and/or making sure that software/service usage within the private network 202 complies with obtained licenses. However, in some embodiments, these responsibilities may be performed by a different device on the private network 202, such as a secondary node 304, an edge device, a device hosting a registry, etc. FIG. 5 is a schematic of an entitlement agent 400 and a metering agent 402 that execute on the primary node 302, or other device(s) responsible for managing licenses, enforcing licenses, and/or making sure that software/service usage within the private network 202 complies with obtained licenses. As shown, the metering agent 402 includes a telemetry application, such as the TPA 312 shown and described with regard to FIG. 4, which uploads telemetry data for the private network 202 to a remote server 30. The metering agent 402 may also include or have access to an analytics engine 404, which may analyze telemetry data and calculate metrics and/or generate visualizations depicting use of software/services by the private network 202 and/or the larger enterprise via an admin portal. The entitlement agent 400 and the metering agent 402 may interface with one another via an API 406. The entitlement agent 400 maintains a local instantiation of a proprietary blockchain 408, which may be a private extension of a global decentralized blockchain, such as Ethereum. As used herein, a blockchain is a collection of records separated into blocks that are linked together using cryptography. Each block in the blockchain may include, for example, a cryptographic hash of the previous block, a timestamp, and transaction data (e.g., a Merkle tree) that memorializes a transaction (e.g., a sale, a trade, an agreement, an immutable transaction, a contract, a smart contract, etc.). The timestamp indicates that the transaction data existed when the block was published at the time indicated by the timestamp. Once a block is recorded, the data in a given block cannot be retroactively altered without altering subsequent blocks, making blockchains resistant to modification and/or tampering. Blockchains are typically managed by a peer-to-peer network for use as a publicly distributed ledger, where nodes collectively adhere to a protocol to communicate and validate new blocks. Local and/or private blockchains, also known as permissioned blockchains, may also be managed by a peer-to-peer network or a trusted intermediary, but access to the distributed ledger may be restricted base on access credentials, user role, biometric data, and so forth. In some embodiments, a local blockchain may have a limited number of instantiations, in some cases as few as a single instantiation, and a corresponding limited number of ledgers. Accordingly, the entitlement agent 400 may utilize an engine for the global decentralized blockchain, such as an Ethereum engine 410 to update blocks of the global decentralized blockchain to match the local instantiation of a proprietary blockchain 408 via an API 412. In some embodiments, the local blockchain can enforce transactions locally without access to the internet. The entitlement agent 400 may also include or interface with a web application (e.g., a user portal 414) that a user can access via a web browser to purchase or otherwise acquire cryptographic tokens (e.g., blockchain based tokens/currency), sell, distribute, or otherwise divest cryptographic tokens, monitor cryptographic token usage, monitor software/service usage, perform automated metering of software/service licenses, manage subscriptions to licenses/services, and so forth.

Figure 6:
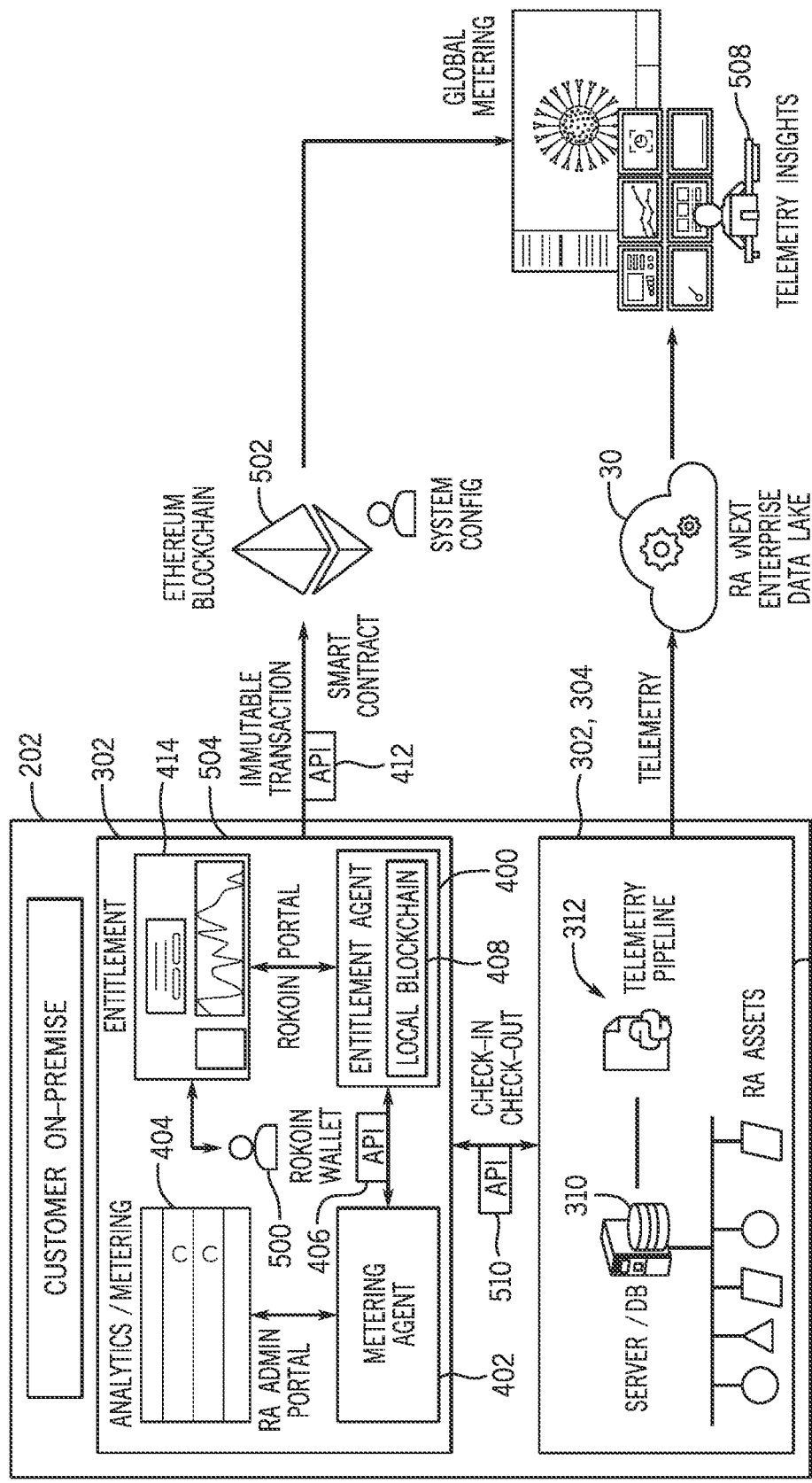
FIG. 6 is a schematic illustrating how software/service licenses for a private network are managed on premises ("on-prem"), in accordance with aspects of the present disclosure.

FIG. 6 is a schematic illustrating how software/service licenses for the private network 202 are managed on premises ("on-prem"). As previously described, the entitlement agent 400 and the metering agent 402 run on the primary node 302 and interact with one another via the API 406. A user may interact with the entitlement agent 400 via the user portal 414 (e.g., RoKoin Portal). The user may utilize the user portal 414 to purchase or otherwise acquire cryptographic tokens, sell, distribute, or otherwise divest from cryptographic tokens, monitor cryptographic token usage, monitor software/service usage, perform automated metering of software/service licenses, manage subscriptions to licenses/services, and so forth. Further, the user may utilize the user portal 414 to manage a cryptographic token wallet 500. This may include, for example, purchasing/selling cryptographic tokens (e.g., RoKoin) or some other fungible or non-fungible tokens, using cryptographic tokens to purchase/sell entitlement (e.g., purchase software licenses, pay for services, true up for previous use of software and/or services, pre-pay for future use of software and/or services etc.). When a user makes a transaction involving cryptographic tokens and/or entitlement, the entitlement agent 400 creates a record of the transaction, such as an immutable transaction (e.g., a smart contract) in the local instantiation of a proprietary blockchain 408, which may be a private extension of a global decentralized blockchain 502, such as Ethereum. Accordingly, the entitlement agent 400 utilizes an engine for the global decentralized blockchain, such as an Ethereum engine, to update blocks of the global decentralized blockchain 502 to match the local instantiation of a proprietary blockchain 408 via the API 412. Accordingly, the immutable transaction (e.g., smart contract) is reflected in the global decentralized blockchain 502 and may be accessible by other individuals within the enterprise and, in some cases, individuals outside of the enterprise (e.g., software vendors/providers, service providers, etc.).

An administrator may interact with the metering agent 402 via an admin portal, which may include the analytics engine 404 shown and described above with respect to FIG. 5. The admin portal 404 may allow an admin to view cryptographic token and/or entitlement trends over time, as well as metrics such as cost per hour, average unused seats, etc. The portion of the primary node 302 hosting the entitlement agent 400, the metering agent 402, and the cryptographic token wallet 500 may be referred to generally as the entitlement management component 506. As previously discussed, in the illustrated embodiment, the entitlement management component 506 runs on the primary node 302, however, embodiments are envisaged in which the entitlement management component 506 runs on a secondary node, a node that hosts a registry, some other node of the private network 202, an edge device, etc. In some embodiments, the entitlement management component 506 may run on its own partition, its own processing core, within its own container, or may be otherwise segregated from the other operations of the primary node 302. However, in other embodiments, the entitlement management component 506 may run on the same processor or the same processing core as a telemetry component 506. A private network may have multiple telemetry components 506 (e.g., a telemetry component 506 running on the primary node and one or more telemetry components 506 running on one or more secondary nodes). As previously described, the telemetry components 506 may receive artifacts 308 from one or more devices 206 indicative of software/service usage by the one or more devices 306. A TPA 312 running within the telemetry component 506 consolidates the received data into a data delta, stores the underlying data and/or the data delta in a data store 310, and periodically transmits the data delta to a remote server 30. In some embodiments, an administrator for the enterprise, a software provider, and/or a service provider may access the data uploaded to the remote server 30 to run analytics on the data and perform global metering of entitlements to make sure the enterprise is not violating its licenses. The telemetry component 506 may also interact with the entitlement management component 504 via an API 510 check entitlements out, check entitlements in, reserve entitlements, request entitlements, and so forth.

Figure 7:
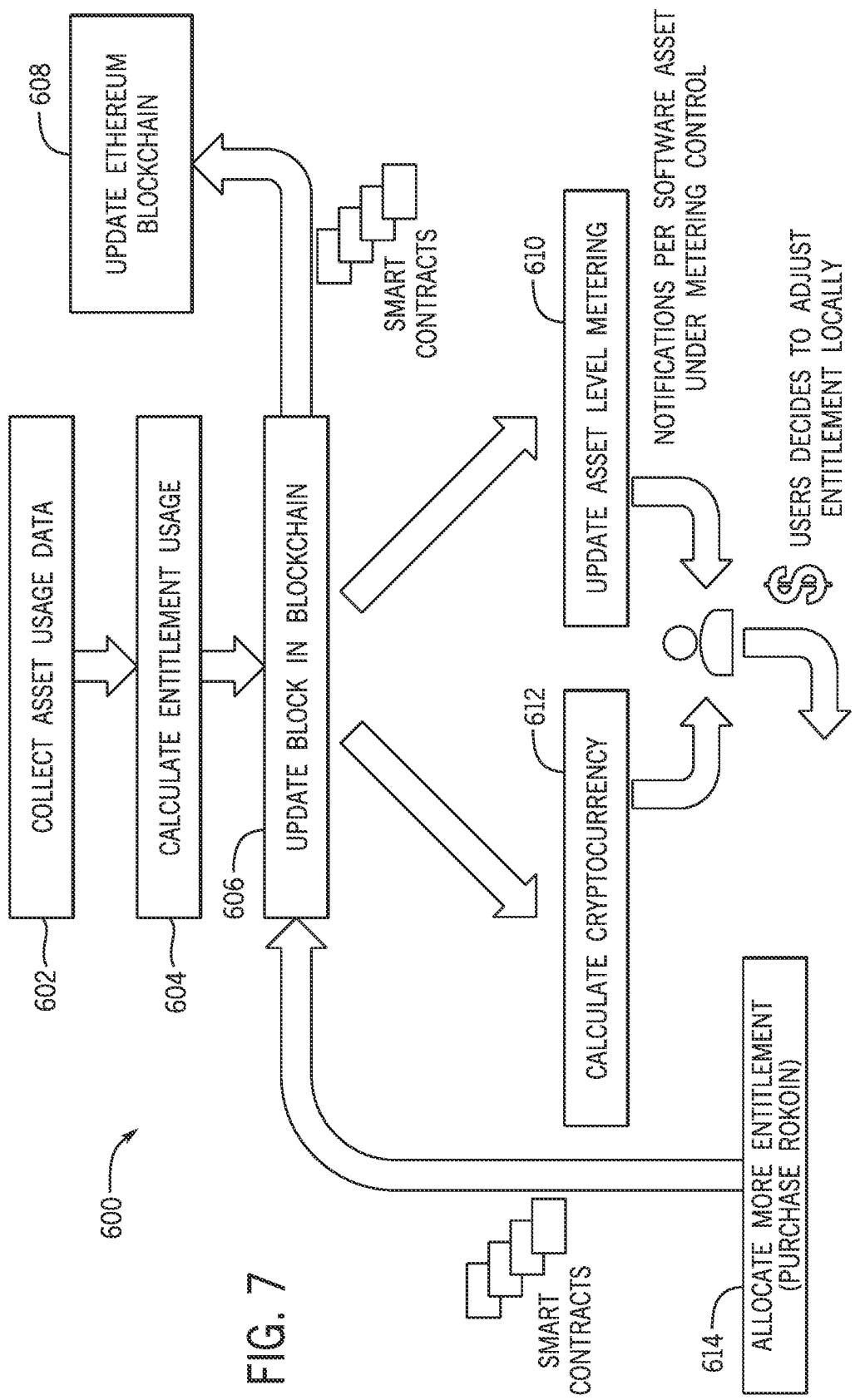
FIG. 7 is a flow chart of a process for using cryptographic tokens to manage entitlements for an enterprise.

FIG. 7 is a flow chart of a process 600 for using cryptographic tokens to manage entitlements for an enterprise. At block 602, software asset usage data is collected and/or received. The software asset usage data may be collected from devices 306 communicatively coupled to the primary node 302, or from secondary nodes 304, via TPAs 312, that are communicatively coupled to one or more devices 306. At block 604, the entitlement usage of the various assets is calculated. This may include, for example, seats used, hours used, features/capabilities used, data used/generated, and so forth. At block 606, a block of the local instantiation of a proprietary blockchain 408 is updated to reflect the entitlement usage. At block 608, the global decentralized blockchain 502 is updated to match the local instantiation of a proprietary blockchain 408, which is a private extension of the global decentralized blockchain 502. The block of both the local instantiation of the proprietary blockchain 408 and the global decentralized blockchain 502 may be representative of immutable transactions (e.g., a smart contracts). At block 610, the asset level metering is updated to reflect available entitlements based on the unused entitlements available. At block 612, a number of cryptographic tokens remaining in the cryptographic token wallet 500 is calculated and the user is notified of the remaining number of cryptographic tokens. At block 614, the user may wish to purchase or otherwise acquire more cryptographic tokens to be used on additional entitlement. In some embodiments, the user may also wish to sell entitlements. Accordingly, the process returns to block 606 and updates a block of the local instantiation of a proprietary blockchain 408 to reflect the change in cryptographic tokens. The process proceeds to block 608 and updates the global decentralized blockchain 502 to match the local instantiation of the proprietary blockchain 408 to reflect the additional cryptographic tokens.

Figure 8:
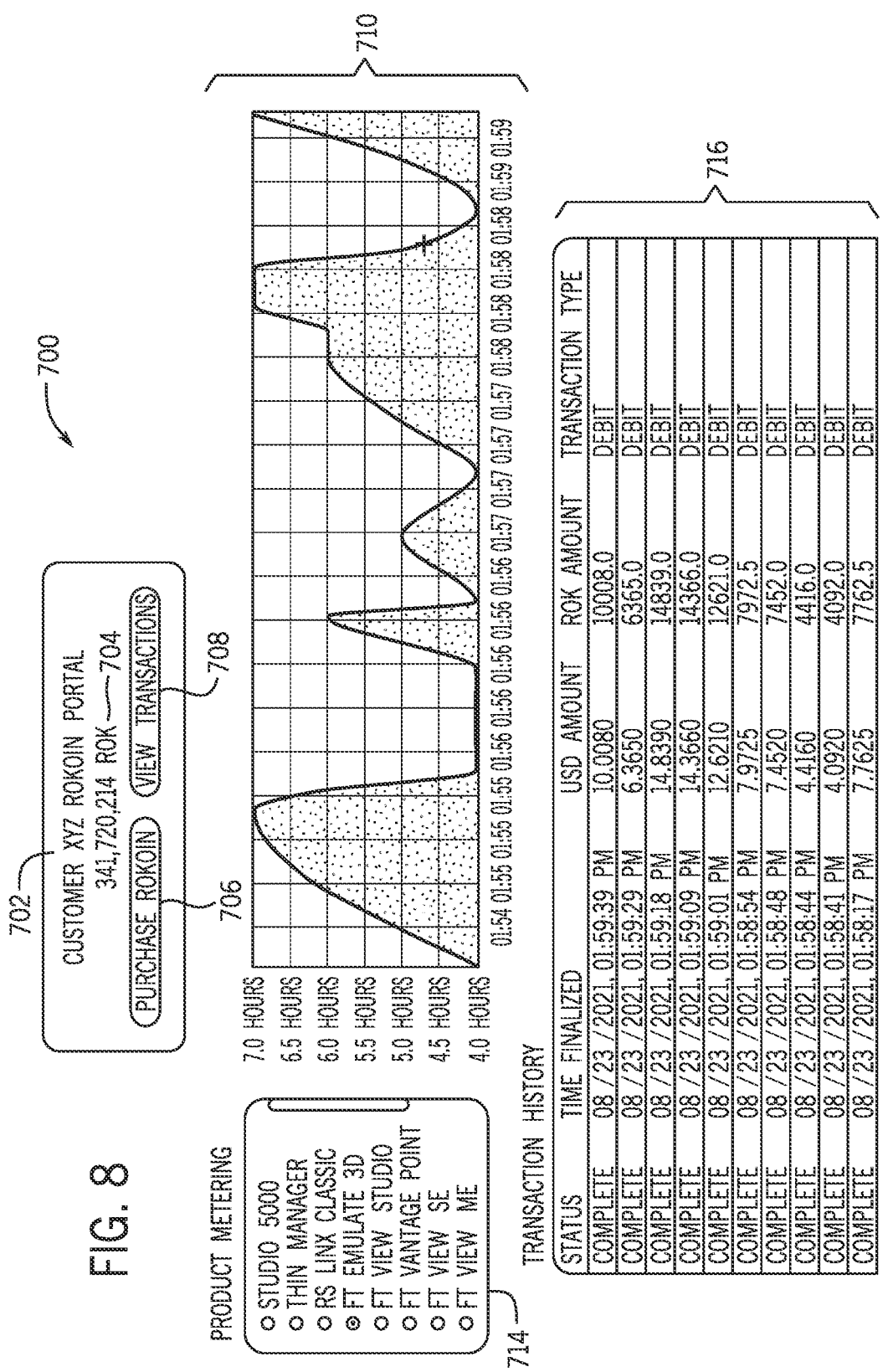
FIG. 8 illustrates a sample graphical user interface (GUI) for a user portal utilized by a user to manage a cryptographic token wallet, in accordance with aspects of the present disclosure.

FIG. 8 illustrates a sample graphical user interface (GUI) 700 for the user portal utilized by a user to manage the cryptographic token wallet 500. As shown, the GUI 700 identifies the customer (702) and a balance of cryptographic tokens (704). The GUI also includes a button 706 that a user selects to purchase additional cryptographic tokens and a button 708 that a user selects to view recent transactions (e.g., via a pop-up window or different page). A product metering portion 710 of the GUI 700 includes a plot 712 of entitlements for selected assets over time and a selection menu 714 that allows the user to select one or more software assets, the entitlement trends of which are to be included in the plot 712. The GUI 700 also includes a transaction history listing 716, which may list transactions within some specified window of time. In the embodiments shown in FIG. 8, the transaction history listing 716 includes fields for transaction status, date and time of transaction completion, dollar amount, cryptographic token amount, and transaction type. However, it should be understood that transaction history listings 716 having fewer fields, more fields, different fields, etc. are also envisaged.

Figure 9:
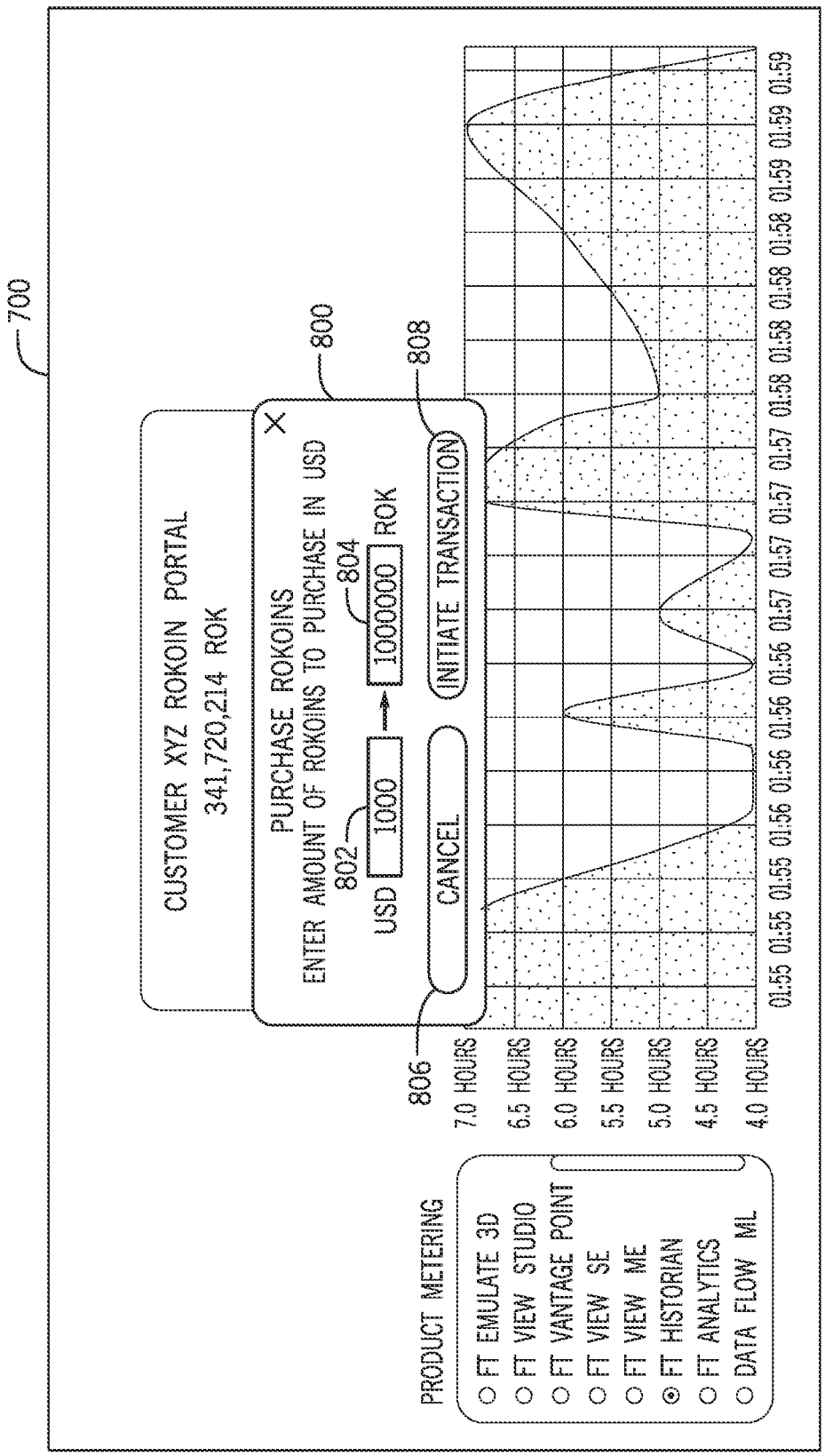
FIG. 9 illustrates the GUI of FIG. 8 when a user selects the button to purchase additional cryptographic tokens, in accordance with aspects of the present disclosure.

FIG. 9 illustrates the GUI 700 of FIG. 8 when a user selects the button 706 to purchase additional cryptographic tokens. As shown, a pop-up window 800 appears that allows the user to specify the amount in dollars they wish to spend on cryptographic tokens (802), or the number of cryptographic tokens they wish to purchase (804). Once one number is entered, the other field may be automatically filled based on a retrieved exchange rate. The user may select to cancel the transaction (806) or initiate the transaction (808). In some embodiments, the user portal may also be configured to allow a user to set a threshold such that the user is notified when the number of cryptographic tokens falls below some threshold value, which may be reflected as a raw number of number of cryptographic tokens, a ratio, a percentage, etc.

Figure 10:
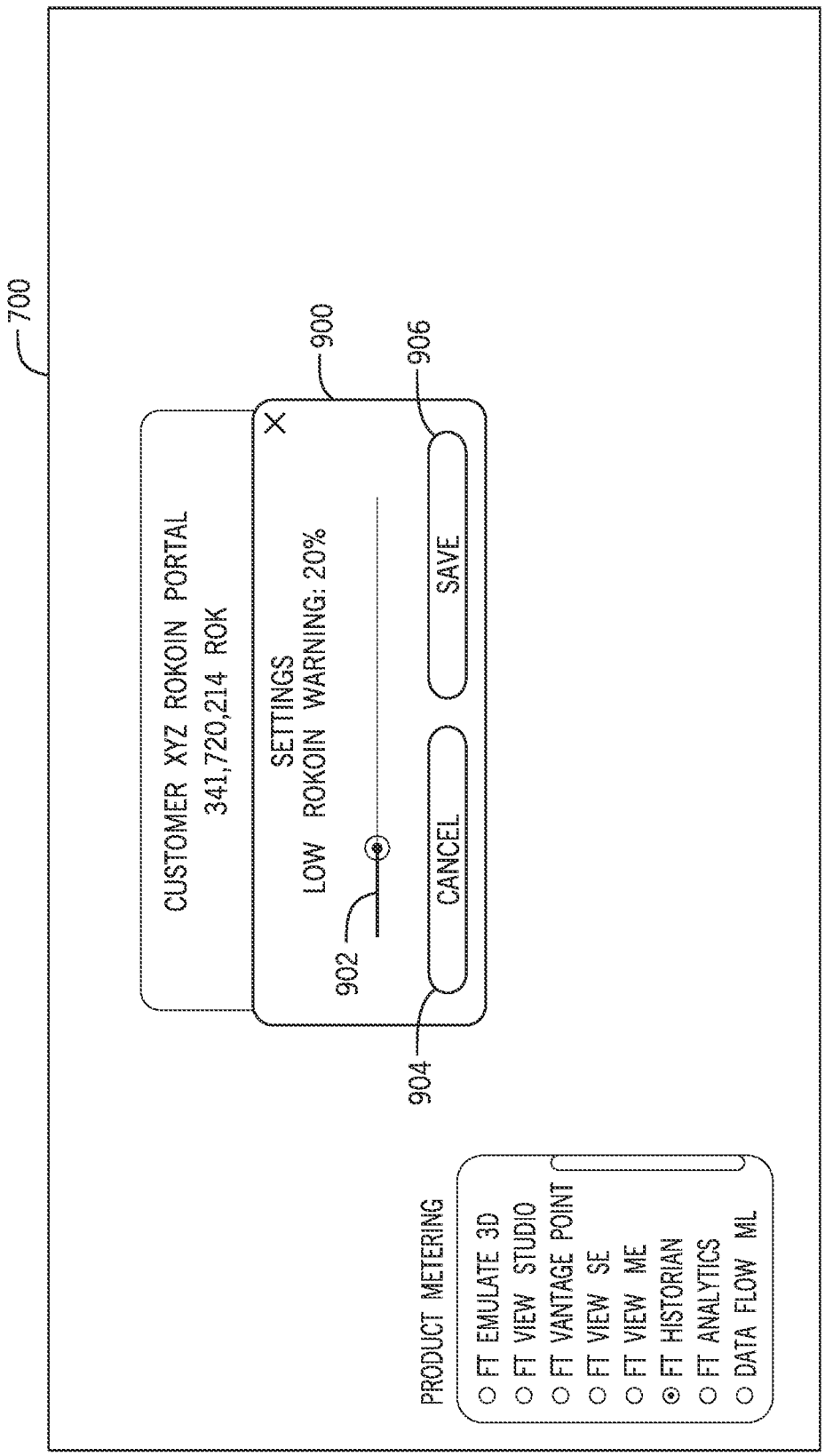
FIG. 10 illustrates the GUI of FIGS. 8 and 9 when a user elects to select a set a cryptographic token threshold, in accordance with aspects of the present disclosure.

FIG. 10 illustrates the GUI 700 of FIGS. 8 and 9 when a user elects to select a set a cryptographic token threshold, such that when the number of cryptographic tokens in the wallet 500 fall below the threshold, the user is notified and given the option to purchase additional cryptographic tokens. As shown, a pop-up window 900 appears that allows the user to specify the threshold number of cryptographic tokens, below which a notification is generated. In the instant embodiment, GUI 700 includes a slider that a user can slide along some range to set the threshold. However, it should be understood that other techniques for using the GUI 700 to set the threshold (e.g., typing a number, selecting an option from a number of recommended options, providing a knob or other actuatable GUI element, etc. After the threshold is entered, the user may select to cancel the adjustment to the threshold (904) or save the threshold (906). Similarly, the user may set threshold for notifications when the number of cryptographic tokens is above threshold value. In response, the user may choose to sell an amount of cryptographic tokens. Along these lines, the user may also set threshold for entitlement below and/or above which the user may wish to purchase or sell entitlements. When such transactions are completed, the system may update the local and global blockchains to reflect the transactions.

Figure 11:
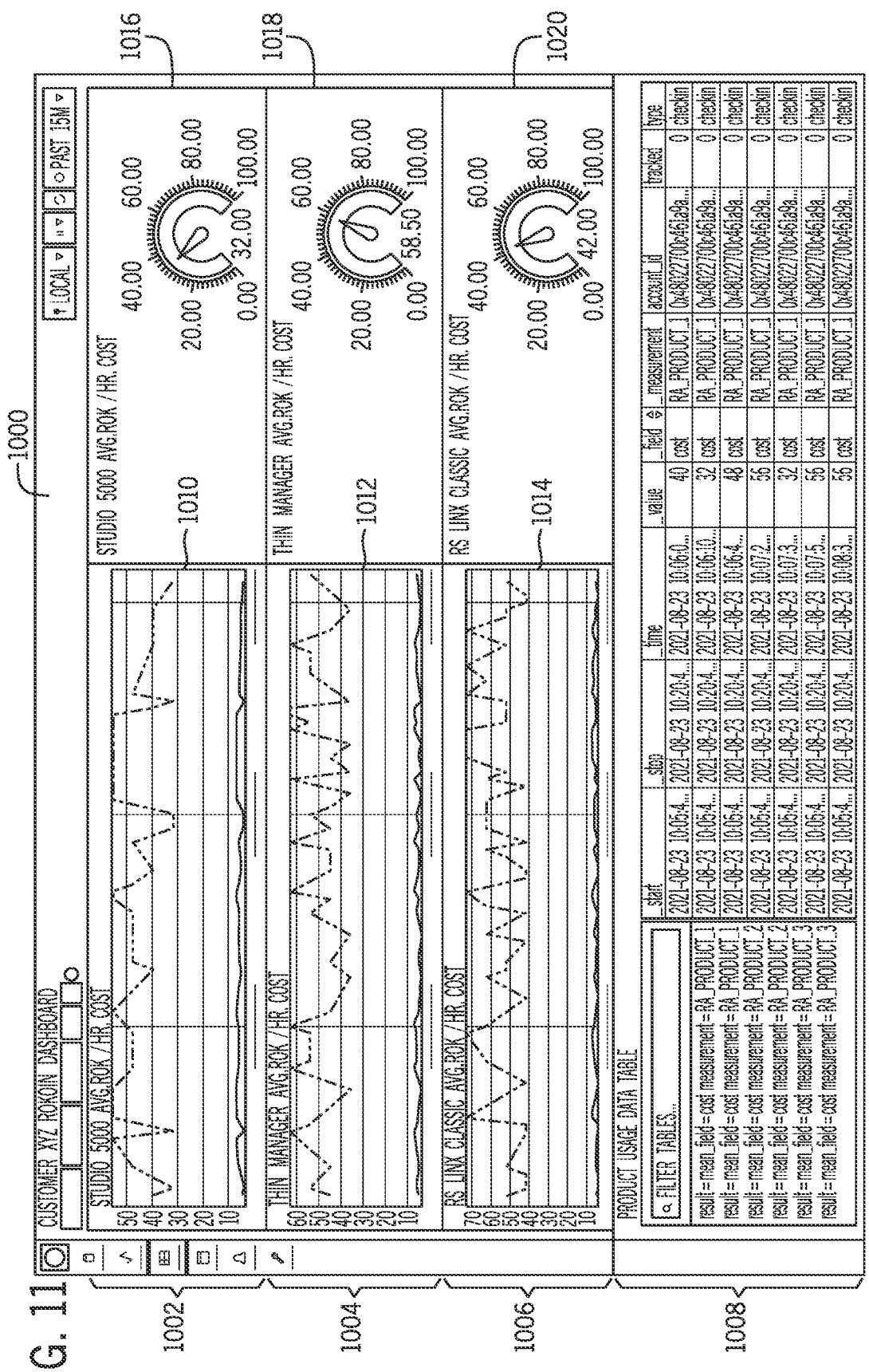
FIG. 11 illustrates a sample GUI for an admin portal utilized by an administrator to view analytics and metering trends for the enterprise, in accordance with aspects of the present disclosure.

FIG. 11 illustrates a sample graphical user interface (GUI) 1000 for the admin portal 404 shown in FIGS. 5 and 6 and utilized by an administrator to view analytics and metering trends for the enterprise. As shown, the GUI is divided into regions 1002, 1004, 1006 that correspond to different software assets utilized by the enterprise, as well as a data table 1008. Each region 1002, 1004, 1006 that corresponds to a respective software asset includes a usage plot 1010, 1012, 1014. In the embodiment shown in FIG. 11, the usage plot 1010, 1012, 1014 plots the entitlement for the respective software asset over time in terms of cryptographic tokens. However, in other embodiments, the usage plots 1010, 1012, 1014 may plot active seats at any given time, hours of entitlement used during windows of time, usage over time in dollars, or some other currency, percentage of entitlement used, and so forth. Each region 1002, 1004, 1006 that corresponds to a respective software asset also includes visualizations of one or more metrics 1016, 1018, 1020. For example, in the embodiment shown in FIG. 11, the visualizations are gauges that depict average cost for the respective software asset in cryptographic tokens per hour. However, in other embodiments, the visualizations may depict cost in dollars per hour, or some other currency, average hours of entitlement used, average percentage of entitlement used, maximum percentage of entitlement used, maximum seats used, and so forth. The data table 1008 may be a data table of data points that are plotted in the regions 1002, 1004, 1006 above that correspond to different software assets. In some embodiments, the administrator may be able to search, sort, and/or filter the data table 1008 to find particular records, sort records, remove, and/or ignore records in the data table 1008. Each record may include one or more fields, such as time collected, start time, end time, value/amplitude, units, user, software asset, and so forth. Accordingly, using the admin portal 404, an administrator may gain insights into software asset usage by an enterprise such that the administrator can optimize management of software asset entitlements for the enterprise.

The present disclosure includes techniques for tracking software asset usage and managing software licenses for an industrial automation system. A computing device collects telemetry data representative of usage of one or more software assets by industrial automation devices within an industrial automation system operated by an enterprise. The computing device references a local blockchain, which may be a private extension of a global decentralized blockchain (e.g., Ethereum) to determine entitlements that the enterprise has for the one or more software assets. The computing device determines entitlement usage based on the received telemetry data. The computing device updates the local blockchain and the global decentralized blockchain based on the determined entitlement usage. The computing device meters usage of the one or more software assets by the one or more industrial automation devices based on a remaining amount of entitlement. If the remaining amount of entitlement falls below some threshold level, or some other desirable level, cryptographic tokens stored in a wallet may be exchanged for additional entitlement. Correspondingly, if the remaining amount of entitlement rises above some threshold level, or some other desirable level, some of the remaining amount of entitlement may be exchanged for cryptographic tokens that may be stored in the wallet. The enterprise may also exchange currency for additional cryptographic tokens that may be stored in the wallet. When such transactions occur, the local and global blockchains may be updated to reflect the transactions. In some cases, the computing device may execute a metering agent to upload the telemetry data to a remote server, analyze the received telemetry data, generate one or more visualizations of identified trends within the received telemetry data, and present the one or more visualizations via an admin portal. The computing device may also execute an entitlement agent to upload the telemetry data to manage the cryptographic token wallet and update the local and global blockchains, generate one or more visualizations of one or more trends in the entitlement usage, and present the one or more visualizations via a user portal.

Use of the disclosed techniques allows for a reliable and secure way to track software asset usage and manage/enforce software licenses for an industrial automation system by shifting management/enforcement of software licenses to blockchains. Accordingly, by shifting management/enforcement of software licenses from software/service providers to blockchains, software/service providers can reduce the resources dedicated to management/enforcement of software licenses elsewhere. Further, blockchain-based software/service licensing provides customers with a more reliable and flexible system for obtaining, managing, and selling software/service licenses without having to periodically renew licenses.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer readable medium storing instructions that, when executed by a processor, cause the processor to perform operations comprising:
receiving telemetry data representative of usage of one or more software assets in controlled operation of one or more industrial automation devices within an industrial automation system operated by an enterprise, wherein the telemetry data is collected during the performance of an industrial process;
referencing a local blockchain to determine one or more licenses associated with the one or more software assets, wherein the local blockchain comprises a private extension of a global decentralized blockchain, wherein the local blockchain comprises a plurality of blocks;
determining one or more usage parameters for the one or more software assets based on the telemetry data and the one or more licenses;
preventing usage of the one or more software assets by the one or more industrial automation devices during the performance of the industrial process in response to the one or more usage parameters exceeding one or more usage thresholds, wherein the one or more usage thresholds are based on the one or more licenses for the one or more software assets;
enabling usage of the one or more software assets by the one or more industrial automation devices during the performance of the industrial process in response to the one or more usage parameters not exceeding the one or more usage thresholds;
performing a transaction exchanging an amount of cryptographic tokens stored in a cryptographic token wallet for additional licenses;
updating the one or more licenses associated with the one or more software assets based on the transaction;
generating a new block representing the transaction, wherein the new block comprises a cryptographic hash of a previous block of the plurality of blocks, transaction data, the updated one or more licenses, usage parameters for the one or more software assets, and a timestamp, wherein the timestamp indicates that the transaction data existed when the respective block was published at a time indicated by the timestamp;
adding the generated new block to the local blockchain; and
transmitting the generated new block to the global decentralized blockchain, wherein the generated new block is added to the global decentralized blockchain in response to receipt of the generated new block.

2. The computer readable medium of claim 1, wherein the operations comprise:
receiving an indication of a purchase of one or more additional cryptographic tokens;
updating the cryptographic token wallet based on the purchase of the one or more additional cryptographic tokens;
generating an additional block representing the purchase of the one or more additional cryptographic tokens;
adding the additional block to the local blockchain; and
transmitting the additional block to the to the global decentralized blockchain to reflect the purchase of the additional cryptographic tokens.

3. The computer readable medium of claim 1, wherein the enabling of the usage of the one or more software assets by the one or more industrial automation devices during the performance of the industrial process in response to the one or more usage parameters not exceeding the one or more usage thresholds is via a first software agent and, wherein the operations comprise updating the local blockchain based on the one or more usage parameters via a second software agent.

4. The computer readable medium of claim 3, wherein the first software agent is configured to upload the received telemetry data to a remote server for analysis.

5. The computer readable medium of claim 3, wherein the first software agent is configured to identify one or more trends based on the received telemetry data, generate one or more visualizations of the one or more identified trends, and present the one or more visualizations via a graphical user interface (GUI) of an electronic display communicatively coupled to the processor.

6. The computer readable medium of claim 3, wherein the second software agent is configured to: add additional blocks to the local blockchain and transmit the additional blocks to the global decentralized blockchain to reflect the one or more usage parameters and changes to an additional amount of cryptographic tokens owned by the enterprise.

7. The computer readable medium of claim 6, wherein the second software agent is configured to generate one or more visualizations of one or more trends in the one or more usage parameters, and present the one or more visualizations via a GUI of an electronic display communicatively coupled to the processor.

8. The computer readable medium of claim 1, wherein the operations comprise:
determining, based on the received telemetry data, a data delta, wherein the data delta comprises a change in artifacts in the telemetry data between a previous set of telemetry data and the received telemetry data;
encrypting the data delta; and
transmitting the encrypted data delta to a remote server for analysis.

9. A method, comprising:
receiving telemetry data representative of usage of one or more software assets in controlled operation of one or more industrial automation devices within an industrial automation system operated by an enterprise, wherein the telemetry data is collected during performance of an industrial process;
determining, based on the received telemetry data, a data delta, wherein the data delta comprises a change in artifacts in the telemetry data between a previous set of telemetry data and of the received telemetry data;
encrypting the data delta;
uploading the encrypted data delta to a remote server for analysis;
referencing a local blockchain to determine one or more licenses associated with the one or more software assets, wherein the local blockchain comprises a private extension of a global decentralized blockchain, wherein the local blockchain comprises a plurality of blocks;
determining one or more usage parameters for the one or more software assets based on the telemetry data and the one or more licenses;
generating limits of future usage of the one or more software assets by the one or more industrial automation devices based on the one or more licenses and the one or more usage parameters;
performing a transaction exchanging an amount of cryptographic tokens stored in a cryptographic token wallet for additional licenses;
updating the one or more licenses associated with the one or more software assets based on the transaction;
generating a new block representing the transaction, wherein the new block comprises a cryptographic hash of a previous block of the plurality of blocks, transaction data, the updated one or more licenses, usage parameters for the one or more software assets, and a timestamp, wherein the timestamp indicates that the transaction data existed when the respective block was published at a time indicated by the timestamp;
adding the generated new block to the local blockchain; and
transmitting the generated new block to the global decentralized blockchain, wherein the generated new block is added to the global decentralized blockchain in response to receipt of the generated new block.

10. The method of claim 9, wherein the one or more licenses comprise a true-up license for past usage of the one or more software assets by the one or more industrial automation devices.

11. The method of claim 9, wherein the one or more licenses comprise a pre-paid license for the future usage of the one or more software assets by the one or more industrial automation devices.

12. The method of claim 9, wherein generating the new block representing the transaction comprises generating a record of an immutable transaction within the generated new block of the local blockchain.

13. The method of claim 9, comprising:
determining that the one or more usage parameters are below a threshold value;
receiving an indication of the amount of cryptographic tokens stored in a cryptographic token wallet that has been exchanged for additional entitlement;
generating an additional block representing the exchange in response to receiving the indication;
adding the additional block to the local blockchain; and
transmitting the additional block to the global decentralized blockchain to reflect the exchange.

14. The method of claim 9, comprising:
determining that the one or more usage parameters exceed a threshold value;
receiving an indication of a portion of the one or more licenses that has been exchanged for an additional amount of cryptographic tokens;
generating an additional block representing the exchange in response to receiving the indication;
adding the additional block to the local blockchain; and
transmitting the additional block to the global decentralized blockchain to reflect the exchange.

15. A non-transitory computer readable medium storing instructions that, when executed by a processor, cause the processor to perform operations comprising:
receiving telemetry data representative of usage of one or more software assets in controlled operation of one or more industrial automation devices within an industrial automation system operated by an enterprise, wherein the telemetry data is collected during the performance of an industrial process;
referencing a local blockchain to determine one or more licenses associated with the one or more software assets, wherein the local blockchain comprises a plurality of blocks;
determining one or more usage parameters for the one or more software assets based on the telemetry data and the one or more licenses;
updating the local blockchain based on the one or more usage parameters;
determining that the one or more usage parameters are below a threshold value;
performing a transaction exchanging an amount of cryptographic tokens stored in a cryptographic token wallet for additional licenses;

updating the one or more licenses associated with the one or more software assets based on the transaction;

generating a new block representing the transaction, wherein the new block comprises a cryptographic hash of a previous block of the plurality of blocks, transaction data, the updated one or more licenses, usage parameters for the one or more software assets, and a timestamp, wherein the timestamp indicates that the transaction data existed when the respective block was published at a time indicated by the timestamp;

adding the generated new block to the local blockchain;

receiving an indication of the amount of cryptographic tokens stored in the cryptographic token wallet that has been exchanged for additional entitlement; and transmitting the generated new block to a global decentralized blockchain, wherein the new block is added to the global decentralized blockchain in response to receiving the indication.

16. The computer readable medium of claim 15, wherein the local blockchain comprises a private extension of the global decentralized blockchain.

17. The computer readable medium of claim 16, wherein the operations comprise sending an update to the global decentralized blockchain based on the one or more usage parameters.

18. The computer readable medium of claim 16, wherein the operations comprise:

receiving an additional indication of a purchase of one or more additional cryptographic tokens;

updating the cryptographic token wallet based on the purchase of the one or more additional cryptographic tokens;

generating an additional block representing the purchase of the one or more additional cryptographic tokens;

adding the additional block to the local blockchain; and transmitting the additional block to the global decentralized blockchain to reflect the purchase of the additional cryptographic tokens.

* * * * *